(12) United States Patent
Miyahara et al.

(10) Patent No.: US 6,604,500 B2
(45) Date of Patent: Aug. 12, 2003

(54) RESIN INTAKE MANIFOLDS AND MANUFACTURING PROCESS THEREOF

(75) Inventors: Yutaka Miyahara, Hiroshima (JP); Hiromitsu Tsuboi, Ikeda (JP)

(73) Assignee: G P Daikyo Corporation, Hiroshima (JP)

( * ) Notice: Subject to any disclaimer, the term of this patent is extended or adjusted under 35 U.S.C. 154(b) by 0 days.

(21) Appl. No.: 09/984,651

(22) Filed: Oct. 30, 2001

(65) Prior Publication Data

US 2002/0050261 A1 May 2, 2002

(30) Foreign Application Priority Data

Oct. 31, 2000 (JP) ........................................ 2000-332038

(51) Int. Cl.$^7$ .............................................. F02M 35/10
(52) U.S. Cl. .................................................. 123/184.61
(58) Field of Search ....................... 123/184.61, 184.21, 123/184.34, 184.42, 184.47; 264/328.7, 328.8, 328.11, 250

(56) References Cited

U.S. PATENT DOCUMENTS

| | | | | |
|---|---|---|---|---|
| 6,021,753 A | * | 2/2000 | Chaffin et al. | 123/184.61 |
| 6,117,380 A | * | 9/2000 | Shirai et al. | 123/184.61 |
| 6,283,078 B1 | * | 9/2001 | Munetoki et al. | 123/184.61 |
| 6,363,900 B1 | * | 4/2002 | Homi et al. | 123/184.21 |

FOREIGN PATENT DOCUMENTS

| | | | | |
|---|---|---|---|---|
| GB | 2279035 A | * | 12/1994 | ........... B29C/65/06 |
| JP | 4-270614 | | 9/1992 | |
| JP | 8-049610 | | 2/1996 | |
| JP | 09177624 A | * | 7/1997 | |
| JP | 11-141424 | | 5/1999 | |

\* cited by examiner

*Primary Examiner*—Henry C. Yuen
*Assistant Examiner*—Hyder Ali
(74) *Attorney, Agent, or Firm*—Nixon & Vanderhye P.C.; Frank P. Presta

(57) ABSTRACT

A resin intake manifold includes a chamber section 12 having an intake air inlet pipe 11, and a plurality of outlet pipes 13 which connect cylinders 32 of an internal combustion engine to the chamber section 12. The resin intake manifold is made by coupling half-parts 21A and 21B of divided halves of the chamber section 12 and the outlet pipes 13 divided along a direction of the pipe axis. The outlet pipes 13 are connected to the chamber section 12 so that the external wall of the outlet pipes 13 on the side of an end 13*b* is integral with the external wall of the chamber section 12. Further, the outlet pipes 12 extend from the chamber section 12 along a direction of the pipe axis, and are curved to extend in a direction away from the chamber section 12 with a curve angle in a range of not smaller than 90° and not larger than 180°, and continuously extend away from the chamber section 12.

16 Claims, 7 Drawing Sheets

DIRECTION TOWARD CHAMBER SECTION 12 | DIRECTION AWAY FROM CHAMBER SECTION 12

RESIN INTAKE MANIFOLDS AND MANUFACTURING PROCESS THEREOF

FIELD OF THE INVENTION

The present invention relates to a resin intake manifold which is provided with an intake air inlet pipe, an intake vessel connected to an intake air supply via the inlet pipe, and a plurality of outlet pipes which connect the intake vessel to cylinders of an internal combustion engine, and to a manufacturing process of such a resin intake manifold.

BACKGROUND OF THE INVENTION

The cylinder head of a multi-cylinder internal combustion engine is connected to an intake manifold for supplying intake air into combustion rooms of the respective cylinders. The intake manifold generally includes an inlet pipe (intake pipe) which is connected to an intake air supply such as a carburetor, an intake vessel (chamber, surge tank) which is supplied with intake air through the inlet pipe, and a plurality of outlet pipes (branched pipes) which connect the intake vessel to the cylinders of the internal combustion engine. The intake manifold is commonly made of a molten resin composition, chiefly due to its superior properties providing lightweight, good insulation, easy manufacture, and more freedom in terms of design.

Such a resin intake manifold is manufactured, for example, by separately casting the intake vessel, the inlet pipe, and the outlet pipes, and then by coupling these components together. This manufacturing process incorporates separate members to make the intake manifold, and thus the mold used to cast each member can be made compact. However, the drawback is that the number of molds becomes large, and it increases the number of steps to couple these components together. This might increase cost or result in low productivity.

An example of this process is described below based on an intake manifold for a three-cylinder internal combustion engine. Manufacture of this intake manifold requires a total of five kinds of molds, one for the inlet pipe, three for the outlet pipes, and one for the intake vessel, so that these components can be separately casted. As a result, coupling of these components requires four steps. Further, each components may be made in the form of half-parts. As the term is used herein, the half-parts are halves of a component which make up a pair of first half-part and second half-part. The half-parts, i.e., the first half-part and the second half-part are combined to form the component. Therefore, in this case, a total of 10 kinds of molds will be required, and coupling of these half-parts requires additional five steps. Thus, this process is not suitable when high productivity is sought, as in the case where resin intake manifolds of a mass-produced engine are manufactured.

Further, since the intake manifold has a complex structure incorporating a large number of components, it is intrinsically difficult to cast it from a molten resin composition in integral form. Thus, there has been proposed a method in which half-parts of the intake manifold itself are casted and later combined. That is, there has been attempts to manufacture the resin intake manifold by casting its half-parts in different molds, and combining these half-parts later. However, due to the configuration of the conventional intake manifolds, the shape of the half-parts becomes a so-called "undershape", and the half-parts are stuck and cannot be easily removed out of the mold. Thus, this method too suffers from low productivity.

SUMMARY OF THE INVENTION

The present invention was made in view of the foregoing problems and an object of the present invention is to provide a resin intake manifold of a configuration which enables efficient production, and to provide a manufacturing process of such a resin intake manifold.

In the present invention, as the term is used herein, "resin" refers to those molding materials which can flow into a mold when melted to become a molten material at a high temperature, and which become sufficiently strong when solidify. Accordingly, the resin used in the present invention is not just limited to so-called polymer resins such as plastic.

In order to achieve the foregoing object, a process according to the present invention is for manufacturing a resin intake manifold including an intake vessel which is supplied with intake air through an intake air inlet pipe, and a plurality of outlet pipes which are connected on one end to respective cylinders of a multi-cylinder internal combustion engine and on the other end to the intake vessel, the outlet pipes being connected to the intake vessel so that an external wall of the outlet pipes on this end is integral with an external wall of the intake vessel, and having a configuration extending from the intake vessel in a curve with a curve angle in a range of larger than 90° and not larger than 180° in a direction away from the intake vessel, and continuously extending away from the intake vessel, the process comprising the steps of molding a pair of half-parts of divided halves of the intake vessel and the outlet pipes divided along a direction of a pipe axis, and then coupling the half-parts on their coupling faces.

It is preferable in this manufacturing process that the pair of half-parts are molded by injection molding, and then coupled to each other on their coupling faces in a mold, using a die rotary injection method (DRI method) or a die slide injection method (DSI method).

According to this process, by the defined positional relationship between the intake vessel and the outlet pipes, the half-parts or the resin intake manifold produced by the DRI method or DSI method will not be stuck on the mold when they are removed.

That is, contrary to common resin intake manifolds which with complex configurations are manufactured into finished products by assembling a large number of parts, the resin intake manifold can be manufactured only by coupling two parts (i.e., a pair of half-parts), and the half-part will not be stuck on the mold. As a result, the resin intake manifold can be efficiently manufactured.

Further, when adopting the DRI method or DSI method in the foregoing manufacturing process, the curve angle of the plurality of outlet pipes may be in a range of not smaller than 120° and not larger than 180°.

The curve angle in this range enables the resin intake manifold to be designed with a predetermined length of the outlet pipes while maintaining the size of the resin intake manifold compact. Effects of this are: 1) intake air can be supplied to the respective cylinders of the internal combustion engine more desirably; and 2) the resin intake manifold can be stored in an engine room of a relatively small size.

In order to achieve the foregoing object, a resin intake manifold according to the present invention includes an intake vessel which is supplied with intake air through an intake air inlet pipe, and a plurality of outlet pipes which are connected on one end to respective cylinders of a multi-cylinder internal combustion engine and on the other end to the intake vessel, wherein: the resin intake manifold is composed of a pair of half-parts of divided halves of the intake vessel and the outlet pipes divided along a direction of a pipe axis, which are coupled to each other, and the outlet pipes are connected to the intake vessel so that an external wall of the outlet pipes on this end is integral with an external wall of the intake vessel, and extend from the intake vessel in a curve with a curve angle in a range of larger than 90° and not larger than 180° in a direction away from the intake vessel, and continuously extend away from the intake vessel.

It is preferable in this resin intake manifold that at least one of boundary areas of the intake vessel and the outlet pipes on the coupling face of one of the half-parts has a raised portion, and the coupling face of the other half-part has a recessed portion to fit the raised portion.

By thus providing the raised portion and the recessed portion which fit into engagement on the coupling faces of the pair of half-parts, the strength of coupling of the half-parts can be improved.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) through FIG. 1(c) are drawings showing a configuration of a resin intake manifold according to the present invention, in which FIG. 1(a) is a perspective view, FIG. 1(b) is a side view; and FIG. 1(c) is a front view.

FIG. 3(a) and FIG. 3(b) are drawings showing a configuration of the resin intake manifold of FIG. 1, in which FIG. 3(a) is a plan view; and FIG. 3(b) is a cross sectional view of the resin intake manifold of FIG. 3(a) taken along line A–A'.

FIG. 4(a) through FIG. 4(c) are drawings showing a configuration of a resin intake manifold according to another embodiment of the present invention, in which FIG. 4(a) is a perspective view; FIG. 4(b) is a cross sectional view taken along line B–B'; and FIG. 4(c) is a perspective view of a modification example of the resin intake manifold of FIG. 4(a).

FIG. 5(a) and FIG. 5(b) are drawings showing a modification example of the resin intake manifold of FIG. 4(c), in which FIG. 5(a) is a perspective view; and FIG. 5(b) is a cross sectional view taken along line C–C'.

DESCRIPTION OF THE EMBODIMENTS

[First Embodiment]

The following will describe one embodiment of the present invention with reference to attached drawings. The present invention apparently is not just limited to the recitations of the following embodiments.

A resin intake manifold according to the present invention is connected to a cylinder head (portion of cylinders) of an in-line four-cylinder internal combustion engine, and is configured to supply intake air (air or a gaseous mixture of fuel and air) into a combustion room of each cylinder.

Figure 1:
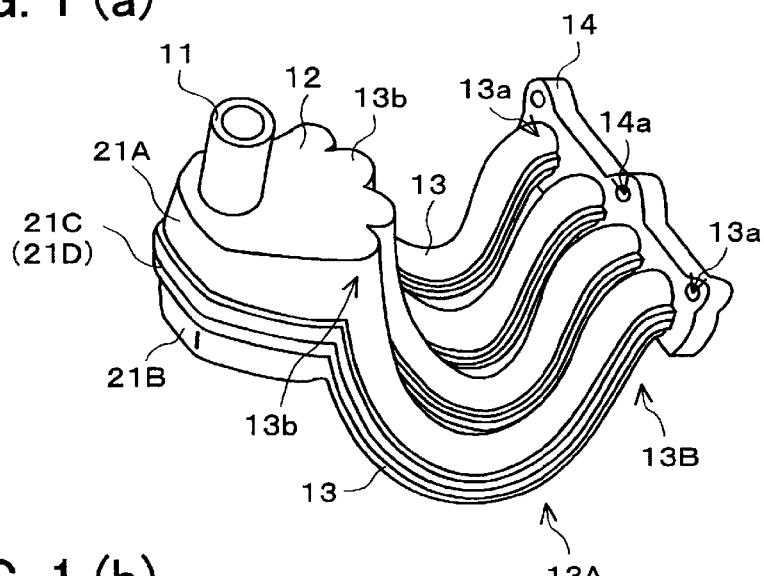
Figure 1:
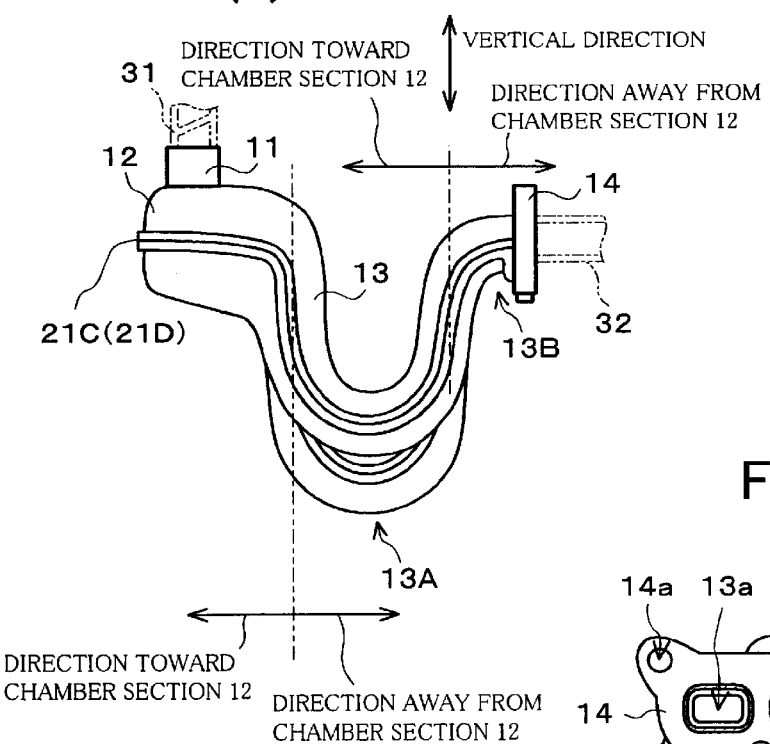
Figure 1:
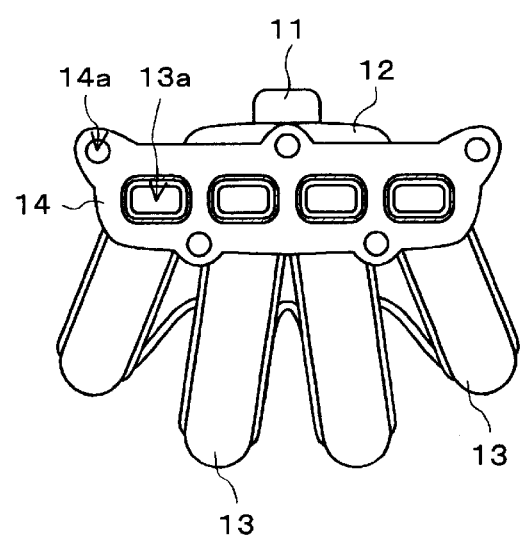
Figure 2:
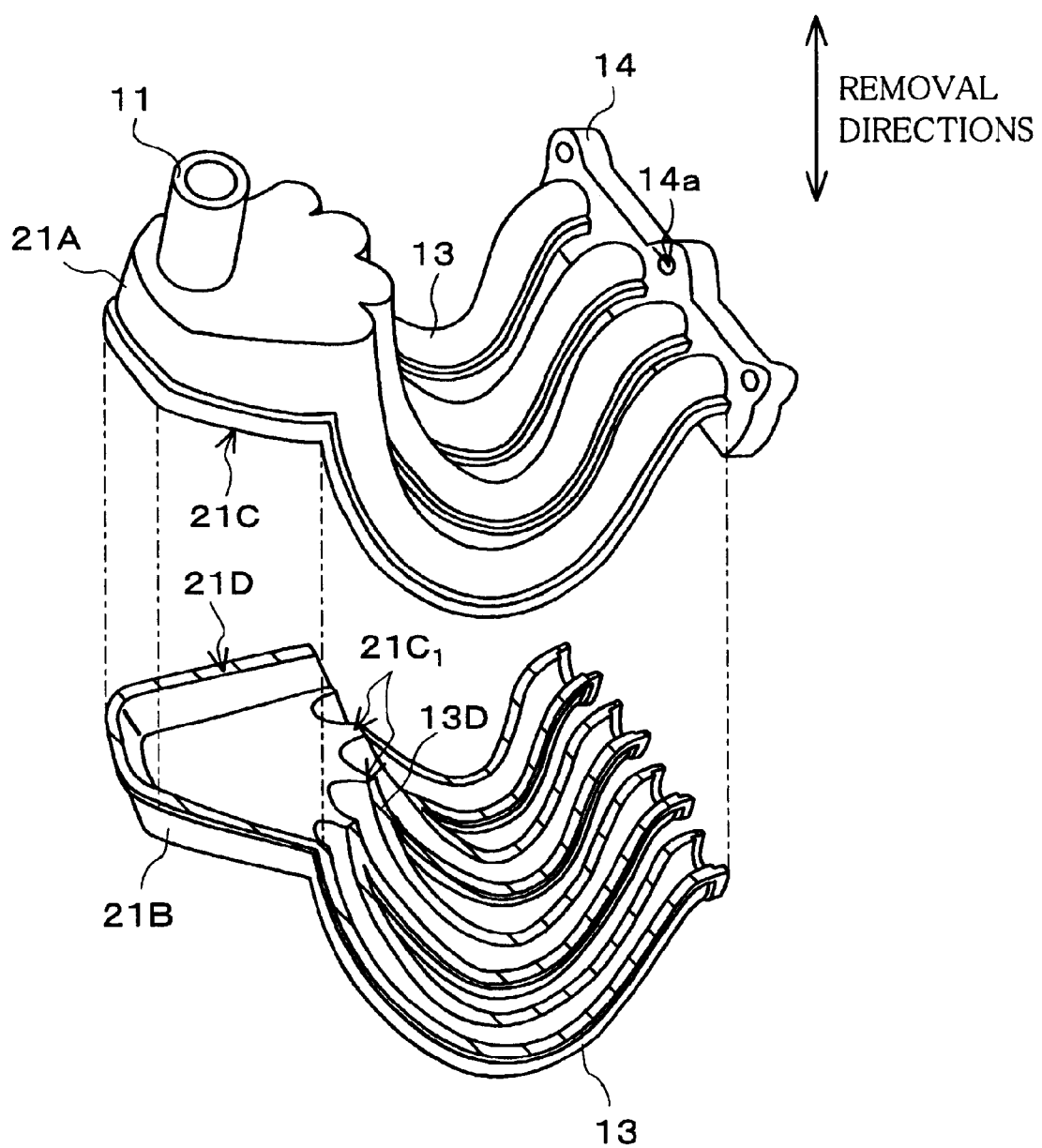
FIG. 2 is a perspective view showing a schematic structure of a pair of half-parts which form the resin intake manifold of FIG. 1.

More specifically, as shown in FIG. 1(a) through FIG. 1(c), the resin intake manifold includes an intake air inlet pipe (intake pipe) 11, a hollow chamber section (intake vessel) 12, and four outlet pipes 13 (each or four pipes combined together are also called "branched pipe(s)" where appropriate). The inlet pipe (intake pipe) 11 is provided on an upper face of the chamber section 12. The chamber section 12 conducts to an intake air supply such as a carburetor (not shown) via the inlet pipe 11. The four outlet pipes 13 each have an end 13a which is connected to a cylinder 32 of the internal combustion engine, and an end 13b which is connected to the chamber section 12. The resin intake manifold has an integrated structure of a pair of half-parts 21A and 21B which are mated on their coupling faces 21C and 21D (FIG. 1 and FIG. 2). Here, the half-parts 21A and 21B have configurations which result from splitting of the chamber section 12 into upper and lower parts while the outlet pipes 13 (branched pipes), which are also split into upper and lower parts along a direction of a pipe axis, remain connected to the half-parts 21A and 21B.

Further, the respective ends 13b of the outlet pipes 13 include a mount member 14 which is provided to define relative positions of the four outlet pipes 13 and connects the ends 13b to the corresponding cylinders 32 of the internal combustion engine. Further, the mount member 14 has bolt holes 14a which may be used to bolt the mount member 14 to the internal combustion engine. Note that, the mount member 14 is integral with the upper half-part 21A (FIG. 2) in the present embodiment, but the mount member 14 may be separately provided from the resin intake manifold. Also, FIG. 1(b) shows only a throttle body 31 of the intake air supply, and only the cylinders 32 of the internal combustion engine.

Note that, the half-part 21A and the half-part 21B each includes one of the half-parts of the four outlet pipes 13 (branched pipes) which are split into two parts along a direction of the pipe axis, and one of the half-parts of the chamber section 12 which is split into two parts while the outlet pipes 13 remain connected thereto. The half-part 21A and the half part 21B of this configuration are coupled with each other to make up a finished intake manifold. That is, in the present embodiment, the half-part 21A and the half-part 21B each have a configuration which results from splitting the four outlet pipes 13 into substantially equal volumed two parts along a direction of the pipe axis, and splitting the chamber section 12 into substantially equal volumed two upper and lower parts. However, the configuration of the half-part 21A and the half-part 21B is not just limited to this example, but any configuration, which can allow easy manufacture and easy coupling of the half-part 21A and the half-part 21B may be adopted.

Further, by "splitting the outlet pipes 13 into two parts in a direction of the pipe axis", it is meant to indicate a state in which, as shown in FIG. 1(a) and FIG. 1(b), the outlet pipes 13 are split into two parts at least from the side of the chamber section 12 to the side of end 13a where the curved portion of the outlet pipes 13 essentially terminates (up to second curved portion 13B in the present embodiment). In the example of FIG. 1(a) and FIG. 1(b), the portion of the outlet pipes 13 near the mount member 14 is inserted in the upper half-part 21A, whereas the portion of the outlet pipes 13 past the second curved portion 13B to the mount member 14 are split into the upper half-part 21A and the lower half-part 21B, thereby "splitting the outlet pipes 13 into two parts in a direction of the pipe axis."

The resin intake manifold is adapted so that the dispositions or extension patterns of the outlet pipes 13 in particular satisfy certain conditions to enable efficient molding using a mold. To this end, the outlet pipes 13, which are connected to the chamber section 12 at the ends 13b, are adapted so that the external wall on the side of the ends 13b of the half-part 21A is integral with a side wall (one face of the external wall) of the chamber section 12. Further, since the resin intake manifold of the present embodiment is for an in-line four-cylinder internal combustion engine, the external wall of all of the four outlet pipes 13 of the half-part 21A on the side of the ends 13b is integral with the side wall of the chamber section 12, extending to the upper face of the chamber section 12.

The outlet pipes 13 are further adapted to extend in a predetermined pattern from the ends 13b to the other ends 13a. Specifically, the outlet pipes 13 are adapted so that they extend downward from the chamber section 12 in a direction of the pipe axis of the inlet pipe 11 (direction perpendicular to the upper face of the chamber section 12 in FIG. 1, i.e., substantially vertical direction), and are curved to extend in a direction away from the chamber section 12 on an angle at least in a range of more than 90° and not more than 180° (first curved portion 13A), and extend further away from the chamber section 12.

Here, the first curved portion 13A refers to a portion in which the outlet pipes 13 continuously extend in a direction away from the chamber section 12 in the form of a near U-curve or V-curve with respect to the side face of the chamber section 12 from which the outlet pipes 13 extend (FIG. 1(b), FIG. 4(b)). The first curved portion 13A excludes the second curved portion 13B, which is a portion of the outlet pipes 13 subsequent to the first curved portion 13A, curved oppositely to the first curved portion 13A in the pipe direction of the outlet pipes 13 (toward right in FIG. 1(b)). Thus, in FIG. 1(b), the angle of curve of the first curved portion 13A is about 180°.

Further, the second curved portion 13B subsequent to the first curved portion 13A is the area of a curve away from the chamber section 12, which is curved about 90° oppositely to the first curved portion 13A in the direction of the pipe axis. That is, in the present embodiment, the outlet pipes 13, after the first curved portion 13A, extend in a direction away from the chamber section 12. Further, in order to balance the intake air flow supplied through the inlet pipe 11, the outlet pipes 13 are provided radially and at the same distance from the inlet pipe 11.

Note that, as to the process of molding the half-parts 21A and 21B from a molten resin composition, or combining the half-parts 21A and 21B, conventional methods can be used. For example, 1) the half-parts 21A and 21B may be molded independently by injection molding or compression molding using different molds, and the two are combined on the coupling faces 21C and 21D by heat-fusion (fusion by the heat of friction) using a vibration method. Alternatively, 2) the half-parts 21A and 21B may be molded or combined together using the same mold by the die rotary injection method ("DRI method" hereinafter) as disclosed in Japanese Unexamined Patent Publication No. 91914/1992 (Tokukaihei 4-91914) (published date: Mar. 25, 1992) [Japanese Examined Patent Publication No. 4830/1995 (Tokukouhei 7-4830) (published date: Jan. 25, 1995)], or by the die slide injection method ("DSI method" hereinafter) as disclosed in Japanese Unexamined Patent Publication No. 87315/1987 (Tokukaisho 62-87315) (published date: Apr. 21, 1987) [Japanese Examined Patent Publication No. 38377/1990 (Tokukouhei 2-38377) (published date: Aug. 30, 1990)]. In either case, as the molten resin composition, conventionally known molten resins, or compositions of molten resins with various additives (e.g., various kinds of reinforcing fibers) can be used.

The DRI method is the method for continuously manufacturing casts by using a pair of molds which are rotatably secured on shafts. These molds have female and male molding patterns on their opposing faces so that the combinations of male-female, female-male, and female—female patterns are attained by the rotation of the mold. The half-parts 21A and 21B are molded in the cavities of the male-female and female-male patterns, respectively, and the half-parts 21A and 21B remaining in the female patterns are mated in the cavity of the female—female patterns. The DSI method is similar to the DRI method in that cavities of male-female, female-male, and female—female patterns are simultaneously attained by lateral displacement of a pair of molds.

Figure 3:
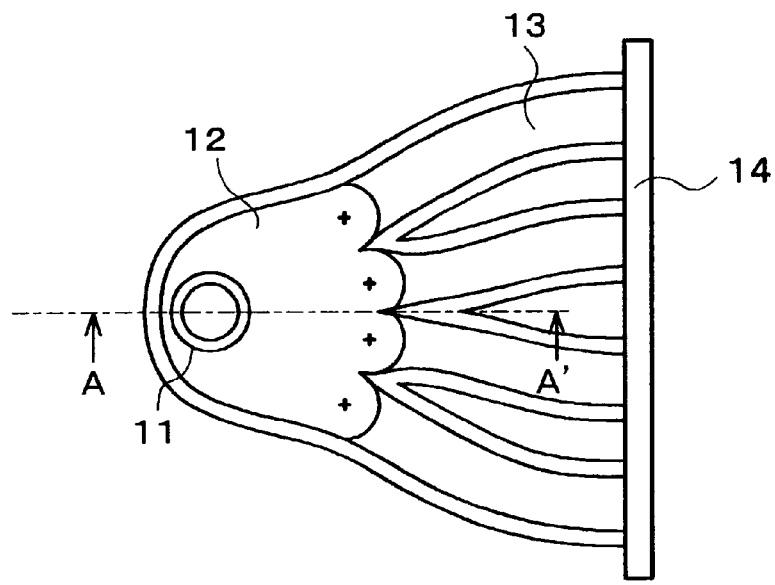
Figure 3:
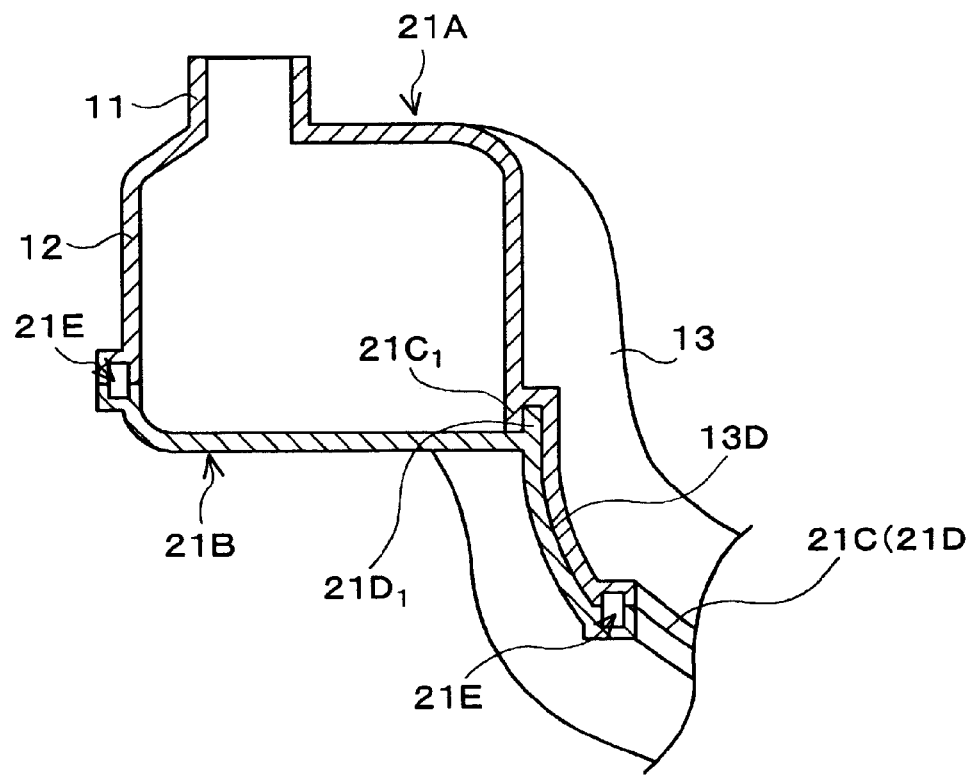

Note that, in either DRI method or DSI method, the half-parts 21A and 21B are mated and joined in the mold by a method using a molten resin composition. That is, in this method, a molten resin composition is supplied or injected between the coupling faces 21C and 21D or around their periphery while the coupling faces 21C and 21D of the half-parts 21A and 21B are in contact with each other, so as to completely fuse them together by curing or other chemical changes of the molten resin composition. For example, FIG. 3(b) is a cross section taken along line A–A' of the resin intake manifold as shown in FIG. 1 or FIG. 3 (a), dissecting the resin intake manifold on a plane through the center of the inlet pipe 11 and perpendicular to the upper face of the chamber section 12. As shown in FIG. 3(b), the coupling faces 21C and 21D of the half-parts have, at the center of the width direction, a groove which continuously extends in a direction of extension of the coupling faces 21C and 21D. These grooves of the opposing half-parts combine to create a void (resin path 21E) which is filled with the molten resin composition to couple the half-parts.

Further, as shown in FIG. 3(b), the groove is not provided in area 13D (see also FIG. 2) where the adjacent outlet pipes 13 share the coupling faces 21C and 21D. This is due to the configuration (layout) of the mold, which makes it difficult to extend the groove into this area. Further, in order to reinforce the coupling of the upper half-part 21A and the lower half-part 21B, the coupling face 21C and the coupling face 21D are provided with a recessed portion $21C_1$ and a raised portion $21D_1$, respectively, which are sized and positioned to fit into engagement.

The effect of providing or not providing this fitting structure of the recessed portion $21C_1$ and the raised portion $21D_1$ can be evaluated by comparing numerical values of stress related to the degree of deformation which is caused when the pressure of 1.0 MPa is applied on the chamber section 12 of the resin intake manifold which is assembled for this purpose. For example, the pressure of 1.0 MPa was applied on the chamber section 12 of an intake manifold which was manufactured by injecting a molten resin composition into the resin path 21E while the coupling faces 21C and 21D of the half-parts 21A and 21B were in contact with each other as shown in FIG. 3 (b). In this case, the stress around the fitting structure was reduced by a great margin to 130 MPa, and the stress around the area ("inter-port welding portion") in the vicinity of the resin path 21E adjacent to an end of the area 13D was reduced by a great margin to 80 MPa. This contrasts to the stress of 142 MPa around the fused portion (corresponds to the inter-port welding portion) which was caused when the molten resin composition was injected into the resin path of the combined half-ports of the same configuration but without the fitting structure.

Apparently, the strength of the half-parts 21A and 21B combined together can be improved by providing the raised portion on at least one of the boundary areas of the chamber section 12 and the outlet pipes 13 of the coupling face 21C (21D) of the half-part 21A (21B), and by providing the corresponding recessed portion on the coupling face 21D (21C) of the half-part 21B (21A).

Also, in the case where the half-parts 21A and 21B are fused together by heat using the vibration method, in which case the half-parts 21A and 21B are slid with respect to each other, it is preferable that the raised portion and the recessed portion are sized with predetermined clearance so that the raised portion can be properly fit into engagement with the recessed portion.

The foregoing dispositions and extension patterns of the outlet pipes 13 can greatly improve manufacture efficiency in the process of molding the half-parts 21A and 21B, or coupling the half-parts 21A and 21B in a mold in the DRI method or DSI method. The following describes this in detail.

For example, when the half-parts 21A and 21B as shown in FIG. 2 are molded by a common molding method other than the DRI method or DSI method, the half-parts 21A or 21B are removed by moving the male pattern or female pattern of an opposing pair (not shown) in a direction of removal, and then by inserting a pushing pin (not shown) into a mold pattern (cavity) in a direction of removal. However, this method, when used in manufacture of a conventional resin intake manifold, causes the following problems.

Figure 6:
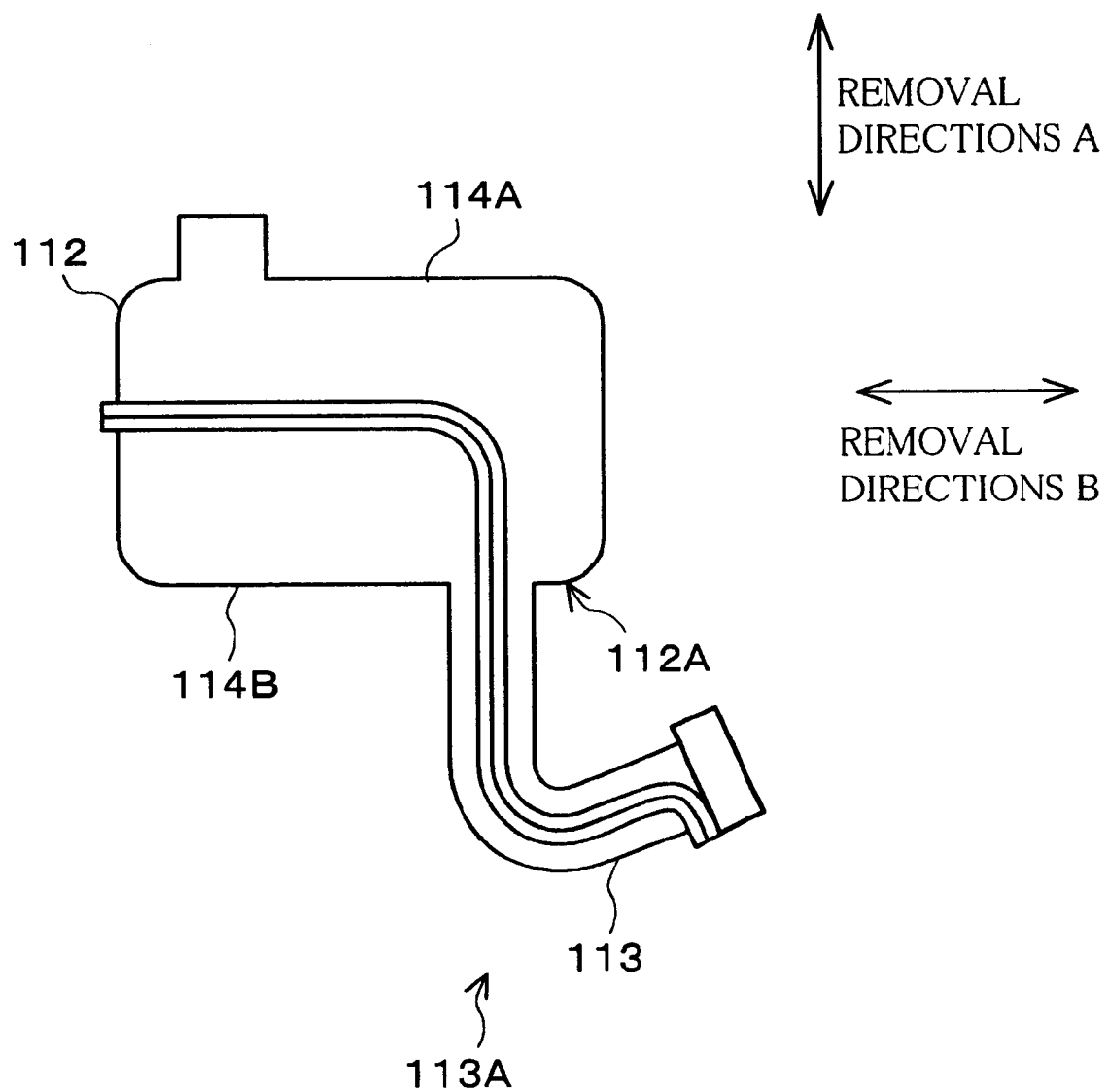
FIG. 6 is a side view showing a schematic structure of a conventional resin intake manifold.

As shown in FIG. 6, a conventional resin intake manifold has a plurality of outlet pipes 113 on the lower side of a chamber section 112, wherein the outlet pipes 113 are curved upward at a curved portion 113A with a curve angle exceeding 90° to provide a sufficient length. Manufacture of this resin intake manifold by coupling half-parts 114A and 114B poses the following problems: 1) When a pushing pin is inserted into a mold to remove the half-part 114A which was molded in the mold of a pair of male and female patterns opposing in removal direction A, an area 112A, which is a portion of discontinuity between a side wall of the chamber section 112 and the outlet pipes 113, is stuck on the mold; and 2) When a pushing pin is inserted into a mold to remove the half-part 114A which was molded in the mold of a pair of male and female patterns opposing in removal direction B, an area which corresponds to the curved portion 113A which is curved with the curve angle exceeding 90° is stuck on the mold. Thus, in either case, the half-part 114A cannot be easily removed out of the mold.

The same problem is also caused when the half-parts 114A and 114B are molded and coupled in a mold by the DRI method or DSI method. That is, the casted resin intake manifold cannot be easily removed out of the mold by the obstruction of the area 112A or curved portion 113A. Thus, manufacture of resin intake manifolds with the conventional configuration as shown in FIG. 6 by coupling half-parts has poor manufacture efficiency because removal of a cast from the mold takes time. This is intrinsic because resin, being inelastic, cannot be forced out of the mold when there is an under portion which corresponds to the area 112A or curved portion 113A.

In the light of these drawbacks, the resin intake manifold according to the present embodiment specifies the positional relationship between the chamber section 12 and the outlet pipes 13, so that an area which corresponds to the area 112A is not present. Thus, there will be no obstruction in the mold when removing the half-part 21A or 21B from the mold (when pushing in the removal direction of FIG. 2) even with a large curve angle of the outlet pipes 13, or when removing the resin intake manifold which was manufactured by the DRI method or DSI method out of the mold (when pushing in the vertical direction in FIG. 1(b)). That is, contrary to common resin intake manifolds which with complex configurations are manufactured into finished products by assembling a large number of parts, the resin intake manifold according to the present embodiment can be manufactured only by coupling two parts (i.e., a pair of half-part 21A and half-part 21B), and the half-part 21A or 21B will not be stuck on the mold. As a result, the resin intake manifold can be efficiently manufactured in terms of time and cost in particular.

Note that, evidently, this does not apply to the case where the outlet pipes 13 extending in a direction away from the chamber section 12 is curved back toward the chamber section 12, as in the case when the curve angle of the first curved portion 13A (see FIG. 1) of the outlet pipes 13 exceeds 180°. In this case, the outlet pipes 13 (or its half-parts) will be stuck on the mold and will not be easily removed out of the mold.

Incidentally, in the present embodiment, the curve angle of the first curved portion 13A is about 180°. However, the angle may be smaller than 180°, provided that it exceeds 90°. Further, larger curve angles allow the outlet pipes 13 to be designed to have a predetermined length while maintaining the compact size of the resin intake manifold, which is advantageous because 1) intake air can be supplied to the respective cylinders of the internal combustion engine more desirably, and 2) the resin intake manifold can be placed in an engine room of a relatively small size. It is therefore preferable that the curve angle be in a range of not smaller than 120° and not larger than 180°. Note that, the curve angle of 120° or larger makes it difficult to evenly fuse the half-parts by heat using the vibration method, which necessitates the use of the DSI method or DRI method to mold and fuse the half-parts.

Further, the resin intake manifold as shown in FIG. 1 is adapted so that the external wall of the outlet pipes 13 on the side of the ends 13b is integral with the side wall of the chamber section 12 while maintaining the shape of the curve. That is, the interior surface of the chamber section 12 which leads to the outlet pipes 13 has an area of four curved portions according to the shape of the inner surface of the outlet pipes 13 (shape of the surface around a circular cylinder). This area of curved surface serves to guide the intake air to easily distribute the intake air from the chamber section 12 equally into the outlet pipes 13. Note that, the resin intake manifold of this configuration can easily be manufactured by the DSI method or DRI method in particular, without using a complicated mechanism such as the slide mechanism or a slant pin.

Further, since the manufacturing process does not require a removal step along the direction of the plurality of outlet pipes 13, the cross section of the outlet pipes 13 does not become non-circular. Thus, the cross section of the outlet pipes can be easily made into a large ring, thus improving a flow (flow efficiency) of intake air.

Further, in the present embodiment, the outlet pipes 13 include the second curved portion 13B to allow for easier connection to the cylinders 32 of the multi-cylinder internal combustion engine. The resin intake manifold having such a configuration can also be manufactured easily by the DSI method or DRI method which has more freedom of design compared with other common methods.

Note that, the inlet pipe 11, which is integral with the chamber section 12 in the present embodiment, may be separately provided. In this case, the resin intake manifold as shown in FIG. 1(a) is assembled by coupling the upper half-part 21A without the inlet pipe 11 to the lower half-part 21B on their coupling faces, and thereafter by attaching the inlet pipe 11. Also, the chamber section 12 in this case is provided with an intake air opening which opens to outside, and a hump for mounting or positioning of the inlet pipe 11.

[Second Embodiment]

The following will describe another embodiment of the present invention with reference to the attached drawings. Note that, members having the same configurations or functions are given the same reference numerals and detailed explanations thereof are omitted here.

A resin intake manifold according to the present embodiment differs from that of the First Embodiment in 1) a direction of extension of outlet pipes with respect to a direction of extension of the inlet pipe, and 2) a first curve angle of the outlet pipes. The following explains mainly these differences.

The resin intake manifold as shown in FIG. 4(a) and FIG. 4(b) is for an in-line four-cylinder internal combustion engine, and includes four outlet pipes 43 analogous to the outlet pipes 13 (see FIG. 1), wherein the resin intake manifold is composed of a half-part 31A and half-part 31B of divided upper and lower halves of chamber section 12 and the outlet pipes 43 divided along a direction of a pipe axis, which are coupled to each other on their coupling faces 31C and 31D.

The outlet pipes 43 are connected to the chamber section 12 at ends 43b, and the external wall of the outlet pipes 43 of the lower half-part 31B on the side of the ends 43b is integral with a side wall (one face of the external wall) of the chamber section 12 while maintaining the shape of the curve.

Further, the outlet pipes 43 extend upward from the chamber section 12 in a direction substantially along a direction of the pipe axis of the inlet pipe 11 from the ends 43b toward the other end, and extend through a curved portion 43A, which is a portion of a curve with an angle of slightly larger than 90° in a direction away from the chamber section 12, and continuously straight away from the chamber section 12. That is, what is different from the resin intake manifold as shown in FIG. 1 is that the outlet pipes 43 extend from the chamber section 12 in a direction (upward) of the inlet pipe 11, and are curved in a direction away from the chamber section 12 only at one portion of the pipes.

Further, the configuration of the chamber section is not just limited to that shown in FIG. 1 and FIG. 4(a) in particular, but a configuration in the form of a rectangular box, as shown by a chamber section 42 in FIG. 4(c) may be adopted.

Figure 4:
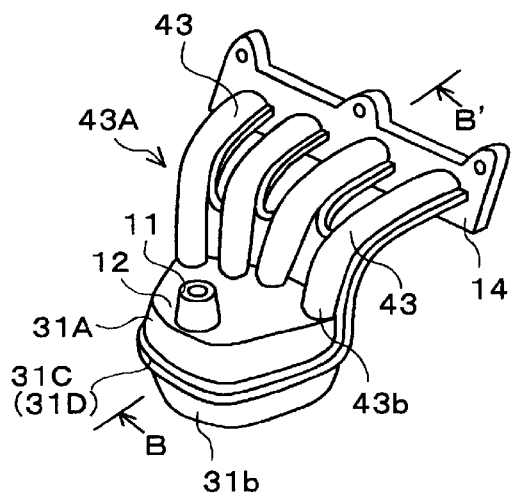
Figure 4:
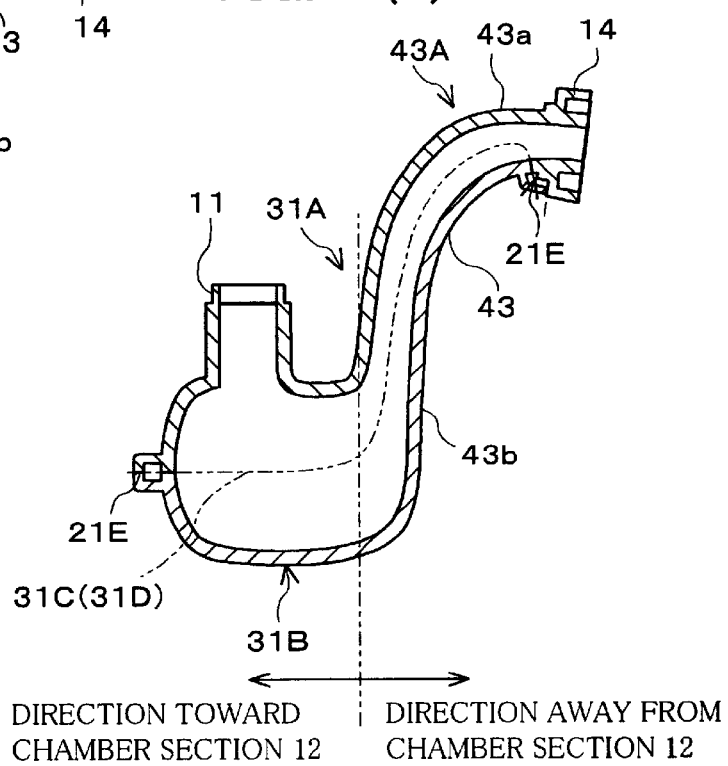
Figure 4:
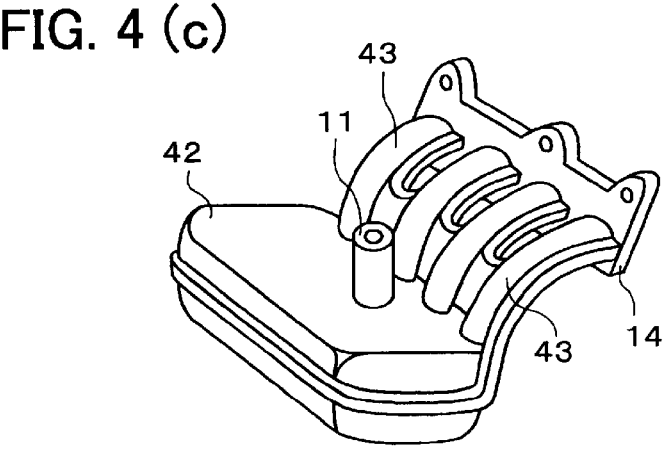
Figure 5:
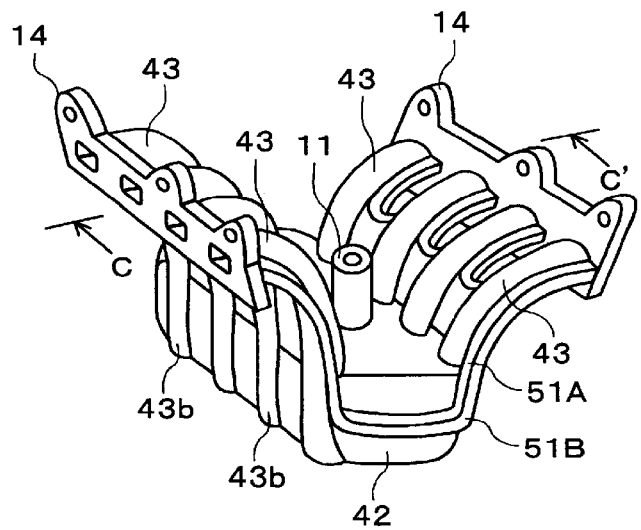
Figure 5:
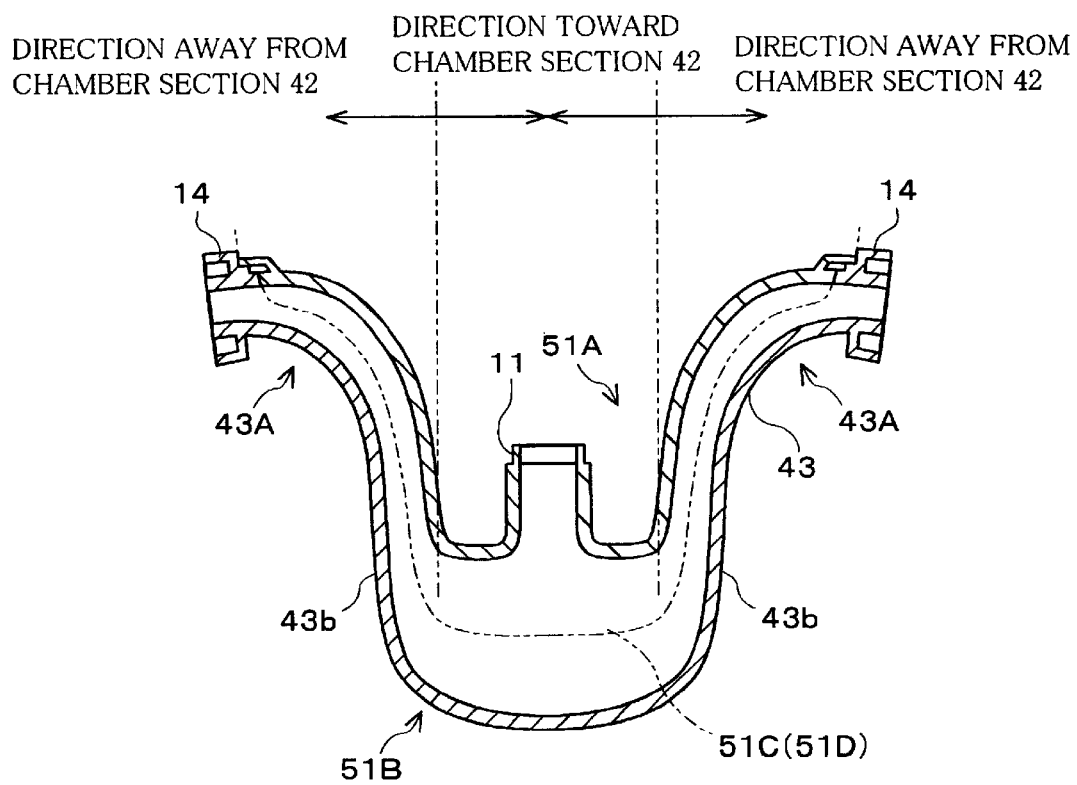

Further, the resin intake manifold for an in-line four-cylinder internal combustion engine as shown in FIG. 4(c) can be modified so that it is used with a V-8 internal combustion engine as shown in FIG. 5(a) and FIG. 5 (b). Specifically, this requires only a change of design of the configuration as shown in FIG. 4(c), so that the inlet pipe 11 is mounted at the center on the upper face of the chamber section 42, and the outlet pipes 43 are provided not only on one side face of the chamber section 42 but also on the other side face.

Note that, this another set of four outlet pipes 43 on the other side face of the chamber section 42 has the same configuration and is provided in the same manner as the four outlet pipes 43 as shown in FIG. 4(c), and thus a detailed explanation thereof is omitted here.

Further, the resin intake manifold according to the present embodiment is manufactured as described in the First Embodiment. However, the resin intake manifold as shown in FIG. 4(a) through FIG. 4(c), with the curve angle of the outlet pipes 43 of a slightly larger than 90°, is more suitable, compared with that of FIG. 1, for the vibration method to couple the half-parts. Nevertheless, in order to ensure even coupling, the DRI method or DSI method is more preferable.

The resin intake manifold as shown in FIG. 5(a) and FIG. 5 (b) is composed of half-parts 51A and 51B of divided upper and lower halves of the chamber section 42 and the outlet pipes 43, which are symmetrical about the chamber section 42, divided along the direction of the pipe axis. Here, coupling faces 51C and 51D of the half-parts 51A and 51B have a curve angle of about 180° in an area including the halves of the chamber section 42 and the outlet pipes 43 on the both sides of the chamber section 42, and therefore it is difficult in practice to use the vibration method to couple the half-parts 51A and 51B. Instead, the DRI method or DSI method is usually employed to couple the half-parts 51A and 51B.

Note that, from the stand point of efficient air flow of the intake air from the inlet pipe to the outlet pipes, it is preferable, as in the resin intake manifold of the present embodiment, that the outlet pipes 43 and the inlet pipe 11 extend in the same direction (upward).

Incidentally, the foregoing First and Second Embodiments described intake manifolds for an in-line four-cylinder internal combustion engine or V-8 internal combustion engine. However, the number or arrangement of cylinders in the multi-cylinder internal combustion engine is not particularly limited. Thus, the number of outlet pipes of the resin intake manifolds according to the present invention is decided according to the number of cylinders of the internal combustion engine to be used therewith.

[Third Embodiment]

The following will describe yet another embodiment of the present invention with reference to the attached drawings. Note that, members having the same configurations or functions as those described in the First and Second Embodiments are given the same reference numerals and explanations thereof are omitted here.

A resin intake manifold according to the present embodiment differs from that of the Second Embodiment chiefly in the position, direction of extension, and configuration of divided parts of the inlet pipe. The following mainly explains these differences.

Figure 7:
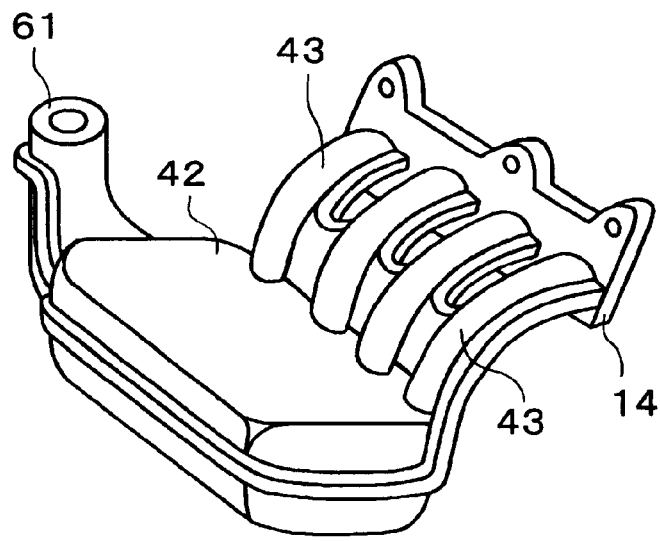
FIG. 7(a) and FIG. 7(b) are drawings showing a configuration of a resin intake manifold according to yet another embodiment of the present invention.
Figure 7:
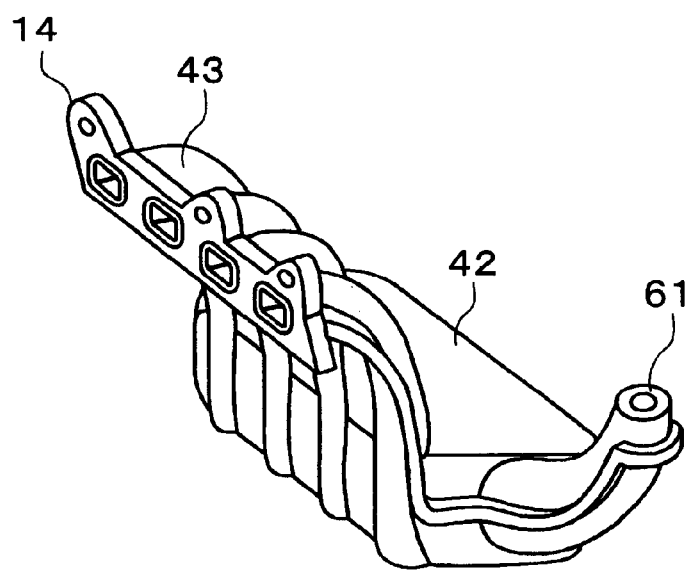

The resin intake manifold according to the present embodiment as shown in FIG. 7(a) and FIG. 7(b) is for an in-line four-cylinder internal combustion engine, and includes a chamber section 12, four outlet pipes 43, and an inlet pipe 61 which extends from a side of the chamber section 12.

As shown in FIG. 7(a) and FIG. 7(b), the resin intake manifold according to the present embodiment differs from that of the Second Embodiment as shown in FIG. 4(a) through FIG. 4(c) in the position, direction of extension, and configuration of divided parts of the inlet pipe 61. The inlet pipe 61 is provided on a side of the chamber section 12. The configuration of the inlet pipe 61 is such that it extends first in a horizontal direction from the site of attachment, and then curved at a certain point to extend upward. That is, the direction of extension of the inlet pipe 61 from the chamber section 12 is horizontal until it is curved to extend upward. Further, a section of the inlet pipe 61 is split into upper and lower parts along a direction of the pipe axis.

According to this arrangement, the inlet pipe 61 does not obstruct the throttle body or air cleaner which are usually disposed above the intake manifold. That is, the inlet pipe 61 of the intake manifold of the present embodiment is provided on a side of the chamber section 12, and extends horizontally to avoid the throttle body or air cleaner which are disposed above the intake manifold, and is curved to extend upward after clearing these obstacles above.

This allows the intake manifold according to the present embodiment to be stored in a small engine room, which in turn makes it possible to have various layouts of other components in the engine room. That is, with the use of the intake manifold according to the present embodiment, the components of the engine room can be disposed more freely.

Further, because the inlet pipe 61 of the intake manifold of the present embodiment is provided on a side of the chamber section 12 and is partially split into substantially equal upper and lower parts in a direction of its pipe axis, the cast can be removed out of a mold without being stuck thereon. Thus, as with the intake manifolds of the previous embodiments, the intake manifold of the present embodiment can be efficiently manufactured.

In the foregoing arrangement, the inlet pipe 61 may be provided, for example, on a side along a lengthwise direction of the chamber section 12, so that, as shown in FIG. 4(*a*), the outlet pipes are separated from the inlet pipe by substantially the same distance. In this way, by the substantially same distance from the inlet pipe to the respective outlet pipes, flow efficiency can be improved, thereby improving efficiency of the engine.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A process for manufacturing a resin intake manifold including an intake vessel which is supplied with intake air through an intake air inlet pipe, and a plurality of outlet pipes which are connected on one end to respective cylinders of a multi-cylinder internal combustion engine and on the other end to the intake vessel, forming the outlet pipes connected to the intake vessel so that an external wall of the outlet pipes on said other end is integral with an external wall of the intake vessel, and having a portion with a configuration extending from the intake vessel in a curve with a curve angle in a range of larger than 120° and not larger than 180° in a direction away from the intake vessel, and further extending away from the intake vessel, said process further comprising the steps of molding a pair of half-parts of divided halves of the intake vessel and the outlet pipes divided along a direction of pipe axis, and then coupling the half-parts on their coupling faces.

2. The process as set forth in claim 1, wherein the pair of half-parts are molded by injection molding, and then coupled to each other on their coupling faces in a mold, using a die rotary injection method or a die slide injection method.

3. The process as set forth in claim 1, wherein an inner wall surface of the outlet pipes serves as an air guide of the intake air from the intake vessel to the outlet pipes.

4. The process as set forth in claim 1, wherein the outlet pipes are further curved oppositely to said portion of the outlet pipes in a pipe direction of the outlet pipes, before further extending away from the intake vessel.

5. A resin intake manifold including an intake vessel which is supplied with intake air through an intake air inlet pipe, and a plurality of outlet pipes which are connected on one end to respective cylinders of a multi-cylinder internal combustion engine and on the other end to the intake vessel,
wherein:
said resin intake manifold is composed of a pair of half-parts of divided halves of the intake vessel and the outlet pipes divided along a direction of a pipe axis, which are coupled to each other on their coupling faces, and the outlet pipes are connected to the intake vessel so that an external wall of the outlet pipes on said other end is integral with an external wall of the intake vessel, the outlet pipes having a portion extending from the intake vessel in a curve with a curve angle in a range of larger than 120° and not larger than 180° in a direction away from the intake vessel, and further extending away from the intake vessel.

6. The resin intake manifold as set forth in claim 5, wherein:
at least one of boundary areas of the intake vessel and the outlet pipes on the coupling face of one of the half-parts has a raised portion, and the coupling face of the other half-part has a recessed portion to fit the raised portion.

7. The intake manifold as set forth in claim 5, wherein an inner wall surface of the outlet pipes serves as an air guide of the intake air from the intake vessel to the outlet pipes.

8. The intake manifold as set forth in claim 5, wherein the outlet pipes are further curved oppositely to said portion of the outlet pipes in a pipe direction of the outlet pipes, before further extending away from the intake vessel.

9. A process for manufacturing a resin intake manifold including an intake vessel which is supplied with intake air through an intake air inlet pipe, and a plurality of outlet pipes which are connected on one end to respective cylinders of a multi-cylinder internal combustion engine and on the other end to the intake vessel, forming the outlet pipes connected to the intake vessel so that an external wall of the outlet pipes on said other end is integral with an external wall of the intake vessel, and having a portion with a configuration extending from the intake vessel in the same direction as the intake air inlet pipe extending from the intake vessel and in a curve with a curve angle in a range of larger than 90° and not larger than 180° in a direction away from the intake vessel, said process further comprising the steps of molding a pair of half-parts of divided halves of the intake vessel and the outlet pipes divided along a direction of a pipe axis, and then coupling the half-parts on their coupling faces.

10. The process as set forth in claim 9, wherein the outlet pipes have a second curved portion that is curved oppositely to said portion of the outlet pipes in a pipe direction of the outlet pipes, before further extending away from the intake vessel.

11. A resin intake manifold including an intake vessel which is supplied with intake air through an intake air inlet pipe, and a plurality of outlet pipes which are connected on one end to respective cylinders of a multi-cylinder internal combustion engine and on the other end to the intake vessel,
wherein:
said resin intake manifold is composed of a pair of half-parts of divided halves of the intake vessel and the outlet pipes divided along a direction of a pipe axis, which are coupled to each other on their coupling faces, and the outlet pipes are connected to the intake vessel so that an external wall of the outlet pipes on said other end is integral with an external wall of the intake vessel, and having a portion with a configuration extending from the intake vessel in the same direction as the intake air inlet pipe extending from the intake vessel and in a curve with a curve angle in a range of larger than 90° and not larger than 180° in a direction away from the intake vessel, and further extending away from the intake vessel.

12. The intake manifold as set forth in claim 11, wherein the outlet pipes have a second curved portion that is curved oppositely to said portion of the outlet pipes in a pipe direction of the outlet pipes, before further extending away from the intake vessel.

13. A process for manufacturing a resin intake manifold including an intake vessel which is supplied with intake air through an intake air inlet pipe, and a plurality of outlet pipes which are connected on one end to respective cylinders of a multi-cylinder internal combustion engine and on the other end to the intake vessel, forming the intake air inlet pipe so that it is arranged to avoid a member that is disposed on a main body of the intake manifold, by extending horizontally from the intake vessel and by further extending upward, and forming the outlet pipes connected to the intake vessel so than an external wall of the outlet pipes on said other end is integral with an external wall of the intake vessel, and having a portion with a configuration extending from the intake vessel in a curve with a curve angle in a range of larger than 90° and not larger than 180° in a direction away from the intake vessel, and further extending away from the intake vessel, said process further comprising the steps of molding a pair of half-parts of divided halves of the intake vessel and the outlet pipes divided along a direction of a pipe axis, and then coupling the half-parts on their coupling faces.

14. The process as set forth in claim 13, wherein the outlet pipes have a second curved portion that is curved oppositely to said portion of the outlet pipes in a pipe direction of the outlet pipes, before further extending away from the intake vessel.

15. A resin intake manifold including an intake vessel which is supplied with intake air through an intake air inlet pipe, and a plurality of outlet pipes which are connected on one end to respective cylinders of a multi-cylinder internal combustion engine and on the other end to the intake vessel, wherein:

said resin intake manifold is composed of a pair of half-parts of divided halves of the intake vessel and the outlet pipes divided along a direction of a pipe axis, which are coupled to each other on their coupling faces, and the intake air inlet pipe being arranged to avoid a member that is disposed on a main body of the intake manifold, by extending horizontally from the intake vessel and by further extending upward, and the outlet pipes are connected to the intake vessel so that an external wall of the outlet pipes on said other end is integral with an external wall of the intake vessel, the outlet pipes having a portion extending from the intake vessel in a curve with a curve angle in a range of larger than 90° and not larger than 180° in a direction away from the intake vessel, and further extending away from the intake vessel.

16. The intake manifold as set forth in claim 15, wherein the outlet pipes have a second curved portion that is curved oppositely to said portion of the outlet pipes in a pipe direction of the outlet pipes, before further extending away from the intake vessel.

* * * * *